Jan. 14, 1958 K. G. HUNTLEY ET AL 2,819,840

BINARY COUNTER AND SHIFT REGISTER APPARATUS

Filed Sept. 12, 1952

Inventors:
KEITH GORDON HUNTLEY
ERIC LAWRENCE CASLING WHITE
BY Ralph E. Atherton
Attorney United States Patent Office 2,819,840

Patented Jan. 14, 1958

2,819,840

BINARY COUNTER AND SHIFT REGISTER APPARATUS

Keith Gordon Huntley, Harlington, Hayes, and Eric Lawrence Casling White, Iver, England, assignors to Electric & Musical Industries Limited, Hayes, Middlesex, England, a company of Great Britain Application September 12, 1952, Serial No. 309,231

Claims priority, application Great Britain September 15, 1951

3 Claims. (Cl. 235—61)

This invention relates to computing devices and in particular relates to number registers especially but not exclusively for binary computing devices.

In computing devices the need sometimes arises for converting a series of pulses into a binary representation of the number of pulses in the series and thereafter for "reading" the number thus represented. For example one way of converting an analogue quantity into a binary representation thereof is to obtain a time interval proportional to the analogue quantity and then, by means of a binary counter, to count pulses having an accurate (for example crystal controlled) repetition frequency, the state of the counter at the end of the time interval being a binary representation of the analogue quantity. If subsequently it is desired to read the number so represented, this can be achieved by transferring the state of each stage of the counter to corresponding stages of a shifting register from which, as is known, the number can be "read" by applying a train of shift pulses which feeds out the number from the last stages of the register, one digit per shift. Such an arrangement is, however, uneconomical of components.

The object of the present invention is to achieve economy of components in number registers especially for binary computing devices.

According to the present invention there is provided a number register including an array of triggers each having two states of equilibrium, means coupling said triggers in cascade in such manner that the triggers can function as a shifting register on the application of shift pulses to said triggers, further means coupling said triggers in such manner that the triggers can function as a binary counter on the application of pulses to be counted to the first of said triggers, and means for selectively rendering said further coupling means ineffective to prevent operation of said register as a binary counter.

In order that the said invention may be clearly understood and readily carried into effect, the same will now be more fully described with reference to the accompanying drawings.

Figure 1:
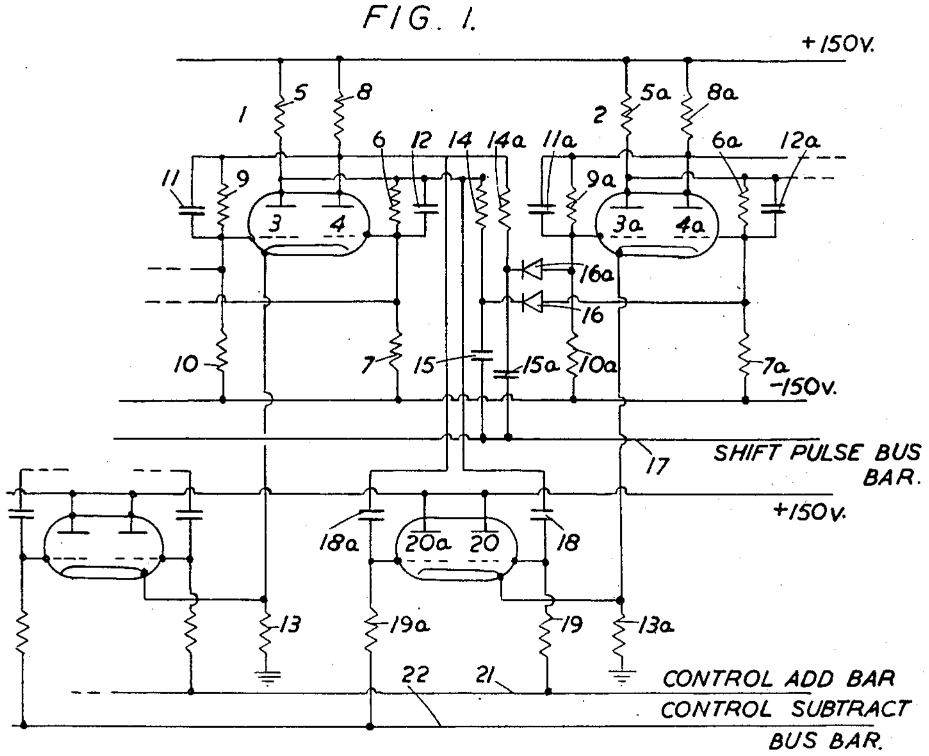
Figure 1 illustrates diagrammatically one form of the present invention.

Referring to Figure 1, two thermionic valve triggers are shown, denoted respectively by the references 1 and 2, but it will be understood that in a practical arrangement a much greater number of such triggers will be employed according to the number of binary digits to be represented. The triggers 1 and 2 are of a known construction and each has two stable states of equilibrium, the trigger 1 comprising two valves 3 and 4 which in this example are thermionic vacuum valves having their anodes and control electrodes cross-coupled by resistances 5 to 10 and condensers 11 and 12. The anode resistances 5 and 8 are taken to a positive potential source of +150 volts while the control electrodes are returned by resistances 7 and 10 to a negative potential source of −150 volts. The valves 3 and 4 are enclosed in a single envelope and have a common cathode resistance 13 whose function will be referred to subsequently. The trigger 2 is of the same construction as the trigger 1 and corresponding parts are denoted by the same reference numerals, distinguished however by the suffix "*a*." The anode of the valve 3 is coupled to the control electrode of the valve 4*a* by a network comprising a resistance 14, condenser 15 and unilaterally conductive device 16 and the anode of the valve 4 is similarly connected to the control electrode of the valve 3*a* by resistance 14*a*, condenser 15*a* and unilaterally conductive device 16*a*. One electrode of each of the condensers 15 and 15*a* is connected to a shift-pulse bus bar 17 as indicated. Furthermore the anode of the valve 3 is coupled by a differentiating network consisting of a condenser 18 and resistance 19 to the control electrode of a "buffer" valve 20. This valve has its anode connected directly to the +150 volt potential source and has its cathode grounded via the resistance 13*a* whereby it is coupled to the valves 3*a* and 4*a*. The anode of the valve 4 is likewise coupled by differentiating network 18*a*, 19*a* to the control electrode of another buffer valve 20*a* enclosed in the same envelope as the valve 20, and having its anode and cathode connected to the anode and cathode of the valve 20. The resistance 19 is taken to a bus bar 21 which is referred to as the "control add" bus bar whilst the resistance 19*a* is taken to further bus bar 22 referred to as the "control subtract" bus bar. The resistance 13 in the common cathode lead of the valves 3 and 4 serves to couple this valve to the buffer valves between the trigger 1 and the stage preceding the trigger 1.

In describing the operation of the circuit, it will be assumed initially that a negative bias is applied to both the "control add" bus bar 21 and the "control subtract" bus bar 22 to render the buffer valves 20 and 20*a* inoperative in any state of the trigger circuit 1. Under this condition, the application of negative shift pulses of suitable amplitude will cause the triggers 1 and 2 and the other triggers connected in the same series to operate as a shifting register of the form described with reference to Figure 10 in "Electronic Engineering," December 1950, page 494, et. seq. However, by stopping the supply of shift pulses to the bus bar 17 and decreasing the negative bias potential applied to either the bus bar 21 or 22, the anode of either the valve 3 or the valve 4 can be coupled to the valves 3*a* and 4*a* to cause the triggers 1 and 2 to operate as a scale of two counter. When operating as a scale of two counter the pulses to be counted are fed to the control electrodes of the valves of the first trigger in the circuit. With the circuit illustrated, this result can be achieved by applying the pulses to be counted, with positive polarity, across the common cathode resistance of the first trigger, that is the resistance of the first trigger corresponding to the resistance 13 of the trigger 1. For instance if the bias applied to the bus bar 21 is reduced such a value that the valve 20 can conduct in response to the positive voltage pulse transmitted by the condenser 18 when the valve 3 is rendered non-conducting and there is a positive potential excursion at the anode of the valve 3, a change of state will be induced in trigger 2 each time the trigger 1 changes from the state in which the valve 3 is conducting to the state in which the valve 3 is not conducting. The former state is taken as representing a digit of value 1 and the latter is taken as representing a digit of value 0 so that the operation described corresponds to counting up (adding) on a scale of two. On the other hand if the bias potential applied to the bus bar 22 is reduced to such a value that the valve 20*a* can be rendered conducting in response to the positive voltage pulse transmitted by the condenser 18*a* when the valve 4 is rendered non-conducting and there is a positive potential excursion at the end of the valve 4 a change of state of the trigger 2 will be induced each time the trigger 1 changes from the state 0 to state 1. Such operation of the circuit is equivalent to counting-down (subtracting) on a scale of two. The arrangement described therefore can function not only as a shifting register but as a binary counter effecting either addition or subtraction.

Figure 2:
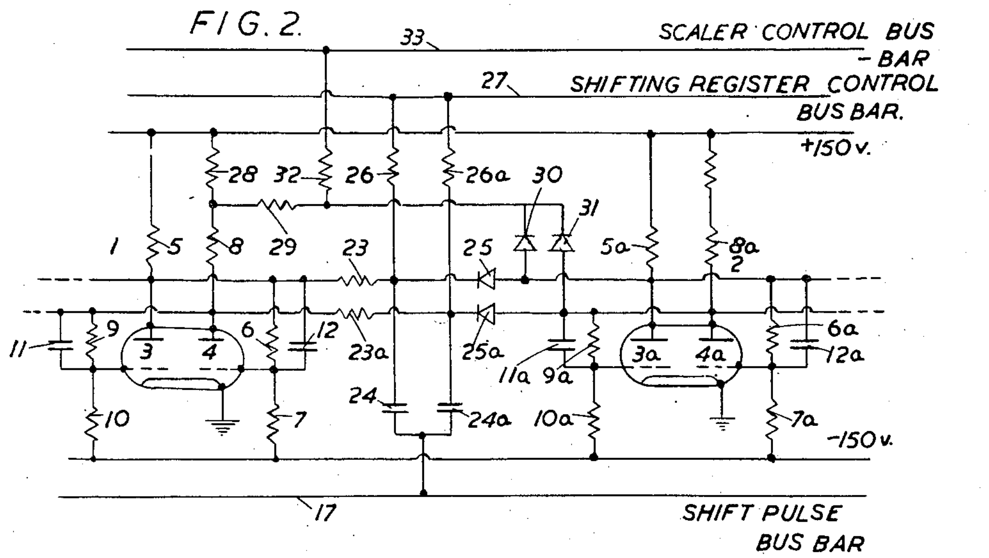
Figure 2 illustrates another and preferred form of the present invention.

In the arrangement shown in Figure 2, the shifting register coupling between the triggers 1 and 2 is in the form of a network consisting of a resistance 23, condenser 24 and unilaterally conductive device 25 connecting the anode of the valve 3 to the anode of the valve 3*a*, and a similar network 23*a*, 24*a* and 25*a* connecting the anode of the valve 4 to the anode of the valve 4*a*. The junctions of resistance 23 and unilaterally conductive device 25, and of 23*a* and 25*a*, are connected by resistances 26 and 26*a* to a "shifting register control" bus bar 27 whilst the condensers 24, 24*a* are connected at one side to the shift pulse bus bar 17. To enable the triggers to function as a binary counter, a relatively small resistance 28 is connected in series with the anode load resistance 8 of the valve 4 and the junction of 8 and 28 is connected via a resistance 29 in parallel to the cathodes of two unilaterally conductive devices 30 and 31 whose anodes are connected respectively to the anodes of the valves 3*a* and 4*a*. The junction of the resistance 29 with the cathodes of the devices 30 and 31 is taken by a resistance 32 to a "scaler control" bus bar 33.

To cause the arrangement of Figure 2 to function as a shifting register, the bus bar 33 is biased positively above +150 volts to a sufficient extent to prevent the devices 30 and 31 from conducting in any circumstance thereby rendering the counting connections between the triggers 1 and 2 inoperative. Under this condition, with appropriate positive bias applied to the bus bar 27, the arrangement will operate as a shifting register in the manner described with reference to Figure 3 of copending United States patent application Serial No. 309,232, now Patent No. 2,785,304, filed September 12,1952 by John Bruce, Keith Gordon Huntley and Eric Lawrence Casling White. On the other hand, if the positive bias applied to the "shifting register control" bus bar 27 is increased to such a level that shift pulses are prevented from having effect under any condition, and the positive bias applied to the "scaler control" bus bar 33 is reduced to about +150 volts, the arrangement operates as a binary counter in the manner described with reference to Figure 17.3 page 605, of "Waveforms" in the Massachusetts Institute of Technology, Radiation Laboratory series of publications. The pulses to be counted are applied, with negative polarity, to the control electrodes of the valves in the first trigger of the register.

For preventing operation as a shifting register, instead of applying a large positive bias to the bus bar 27, it is sufficient to cut off the supply of shift pulses.

In the form of the present invention described in Figure 2, all the unilaterally conductive devices 25, 25*a*, 30 and 31 may be crystal diodes.

The present invention can also be applied in other ways so that the triggers in a given array can be caused to perform a selected one of several functions. For example two sets of shift couplings may be provided between triggers in a given series, associated with separate shift pulse bus bars and ararnged to give shift in opposite directions on the application of shift pulses to the appropriate bus bars. Moreover couplings for giving "sideways" shift from one series of triggers to another series in parallel with the first may be provided in addition to one or two sets of shift couplings between the triggers of each series, an additional bus bar being provided for the application of pulses to give sideways shift.

What we claim is:

1. A number register comprising a series of triggers each trigger comprising two valves each having at least a cathode, a control electrode and an output electrode, and means intercoupling said valves to establish one state of equilibrium for each trigger with one valve conducting and a second state of equilibrium for each trigger with the other valve conducting, a source of shift pulses, first coupling means coupling said triggers in cascade and to said source to set each trigger but the first in the state of the preceding trigger in response to a shift pulse, second coupling means coupling each trigger but the last to the succeeding trigger to produce a change of state of each succeeding trigger in response to each alternate change of state of the preceding trigger, said second coupling means comprising a plurality of paths each connected from an output electrode of one trigger to an electrode of a succeeding trigger, and each comprising a single unilaterally conductive device, and conditioning means comprising a bias source, and resistors connected from said bias source to said unilaterally conductive devices in said paths one resistor for each device, said bias source being variable for selectively biasing said unilaterally conductive devices to selectively render said second coupling means responsive and unresponsive to any change of state of said triggers.

2. A register according to claim 1, each trigger comprising a common cathode impedance connected to the cathodes of both valves of the respective trigger, and said second coupling means comprising a first path from the output electrode of one valve of each trigger but the last to the cathodes of the succeeding trigger, a second path from the output elecrode of he other valve of each trigger but the last to the cathodes of the succeeding trigger, each first and second path comprising individual buffer valves having a control electrode connected to the corresponding trigger-valve output electrode and having an output electrode connected to the cathodes of the succeeding trigger, whereby said register can be selectively conditioned by said conditioning means to function as a shift register, an adding register, and a subtracting register.

3. A register according to claim 1, said second coupling means comprising a first path from the output electrode of one valve of each trigger but the last to the control electrode of one valve of the succeeding trigger, a second path from the same output electrode of the same valve of each trigger to the control electrode of the other valve of the succeeding trigger, each path including a unilaterally conductive device having like electrodes connected to said same output electrode of the corresponding trigger, and the resistor from the bias source to each path being connected to said connected electrodes of said unilaterally conductive devices.

References Cited in the file of this patent

UNITED STATES PATENTS

| | | |
|---|---|---|
| 2,445,215 | Flory | July 13, 1948 |
| 2,500,294 | Phelps | Mar. 14, 1950 |
| 2,580,771 | Harper | Jan. 1, 1952 |
| 2,634,052 | Bloch | Apr. 7, 1953 |
| 2,666,575 | Edwards | Jan. 19, 1954 |

OTHER REFERENCES

"Interim Report on the Physical Realization of an Electronic Computing Instrument" by Bigelow et al. January 1, 1947; published by Princeton, New Jersey Institute for Advanced Study. Pages 97 and 99*c*.